Nov. 12, 1940.   B. I. BUCK   2,221,698
TRANSFER CONVEYER MECHANISM
Filed Nov. 30, 1938
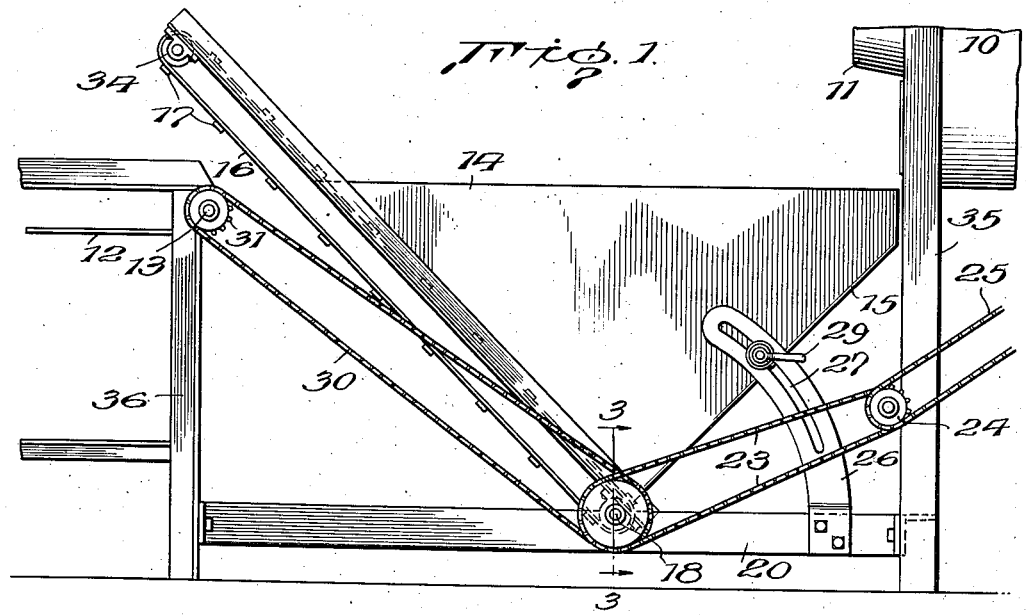
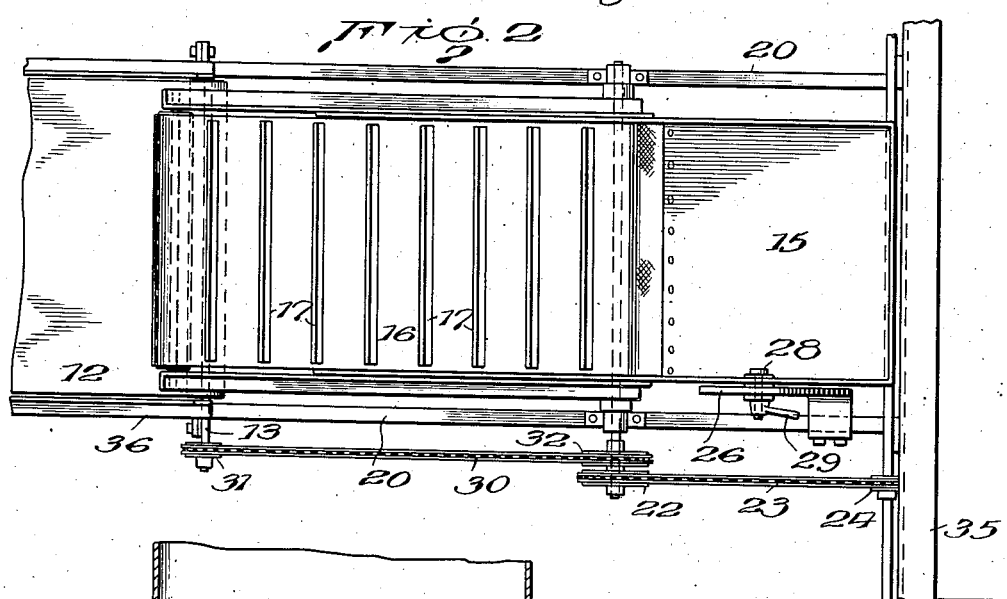
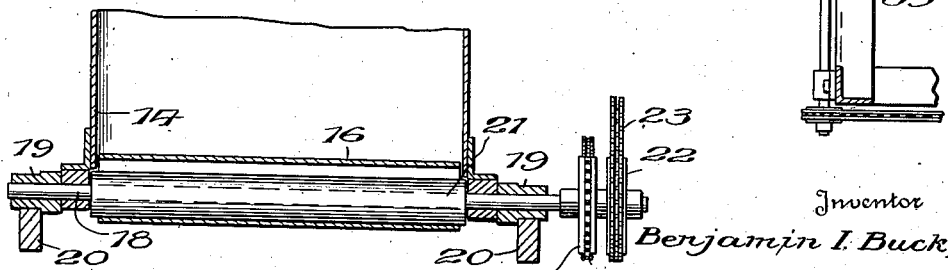
Inventor
Benjamin I. Buck,
By Church & Church
His Attorneys Patented Nov. 12, 1940

2,221,698

UNITED STATES PATENT OFFICE 2,221,698

TRANSFER CONVEYER MECHANISM

Benjamin I. Buck, Baltimore, Md.

Application November 30, 1938, Serial No. 243,241

1 Claim. (Cl. 198—58)

This invention relates to improvements in conveyer mechanisms and, particularly, to apparatus for handling articles that may be bruised or damaged, such as certain vegetables, for instance.

The present apparatus is especially designed for use in apparatus for snipping string beans, wherein the beans, after the snipping operation, are transferred to a suitable surface where they can be sorted, in that the damaged or otherwise inedible beans are removed.

One object of the present invention is to provide an adjustable receptable for receiving the beans from the snipping apparatus and transferring them to the sorting surface, the receptacle and transfer means being adjustable relatively to the sorting surface and the point of discharge of the snipper whereby damage or bruising of the beans by impacting against the receptacle and sorting surface can be minimized or eliminated regardless of the physical characteristics or degree of ripeness of the beans.

A further object of the invention is to provide a transfer receptacle between the snipping device and the sorting surface, with separate supporting frames for said device and surface held in fixed, spaced relation to each other by the supporting members of the receptacle.

More specifically, the invention contemplates a hopper interposed between a snipping compartment and a sorting surface in the form of an endless traveling belt, said hopper comprising a second traveling belt for removing beans deposited in the hopper by the snipper and depositing them on said surface. The hopper, and the belt for transferring the beans from said hopper to said surface, are pivotally supported and by rocking said elements, the vertical elevation of the belt and one wall of the hopper is readily adjusted to vary the distances between said belt and wall and the sorting surface and snipper discharge, respectively.

With these and other objects in view, the invention consists in certain details of construction and combinations and arrangements of parts, all as will hereinafter be more fully described, and the novel features thereof particularly pointed out in the appended claim.

In the accompanying drawing, illustrating the preferred embodiment of the invention—

Figure 1 is a side elevation, a portion only of the snipping chamber and the sorting surface being illustrated;

Fig. 2 is a top plan view of the hopper or transfer receptacle; and

Fig. 3 is a transverse section on the line 3—3 of Fig. 1.

A container for the articles to be treated is indicated at 10. In the present instance, a string bean snipping machine is utilized for illustrating the invention. The beans are snipped or have the tips severed, in container 10, and are discharged at the spout 11. After this operation, they must be sorted, so to speak, in that the damaged or otherwise inedible beans must be removed. For this reason, the snipped beans are transferred to a sorting surface 12, preferably in the form of an endless traveling belt adapted to be driven by a shaft 13.

The snipped beans are discharged at spout 11 into a receptacle or hopper 14, the beans falling on the inclined end wall 15 of said hopper. At the opposite end of the hopper, there is an inclined, endless traveling belt 16, provided with cross-pieces 17, by which the beans are carried upwardly and discharged at the upper extremity of the belt onto the sorting surface 12.

Naturally the degree of ripeness of the beans varies with the time at which they are harvested and, also, their physical characteristics vary with their degree of ripeness. As a consequence, it is desirable to, at times, alter the relative positions of the hopper, including the belt 16, with respect to spout 11, and sorting surface 12. To obtain this adjustability, the hopper 14 is pivotally supported on a shaft 18 journaled in suitable bearings 19 in sills 20 and belt 16 is driven by a roller 21 on said shaft. Shaft 18 has a sprocket 22 at one end and is adapted to be driven by chain 23 from a sprocket 24 which, in turn, is driven through a chain 25 from any suitable source of power.

In the present structure, transfer belt 16 constitutes substantially one end wall of the hopper 14 and, as will be apparent, by rocking the hopper and belt about shaft 18, end 15 of the hopper can be raised or lowered relatively to spout 11 and, likewise, the upper extremity of the belt can be adjusted relatively to the supporting surface 12. To retain the hopper in any desired position, a bracket 26, having an arcuate slot 27 therein is mounted on one of sills 20 and a clamping nut 28 extends through said slot and is carried by the side wall of the hopper. A handle 29 on the clamping nut facilitates tightening the latter so as to firmly secure the hopper at any desired point of adjustment.

The belt 12 forming the so-called sorting surface is driven by sprocket chain 30 on sprockets 31, 32, on shafts 13, 18, respectively. The upper end of the transfer belt 16 travels around a roller 33, but, as previously described this belt is driven by the roller 21 on shaft 18. In this way, the two belts 12 and 16 are actuated independently of one another and, consequently, the distance between the belt 12 and the upper extremity of belt 16 can be varied at will without interfering with the driving connections for said belts.

With this arrangement, it is also possible to rigidly maintain the spacing of the supporting frames of the snipper and sorting surface. As illustrated, the container 10 is supported by one frame, a portion of which is illustrated at 35, and the belt 12 by a separate frame 36, with the sills 20 rigidly connected at opposite ends to said two frames and serving as spacer elements for maintaining the two frames in proper spaced relation.

While a bean-snipping apparatus has been adapted for purposes of illustrating the present invention, it will be appreciated that the adjustable transfer mechanism is capable of usage in connection with other articles or commodities that might be bruised or otherwise damaged in the handling thereof under circumstances such as exist in the present apparatus.

What I claim is:

In a vegetable-handling machine comprising a container in which the vegetables are treated, a hopper into which the vegetables are discharged from said container, an endless traveling belt by which the vegetables are removed from the hopper, and a traveling receiving surface onto which the vegetables are discharged from said belt, a drive shaft, and drive connections between said shaft and traveling belt and conveyer, respectively, said hopper being rockable on said shaft without affecting said drive connections and said traveling belt also being rockable about said shaft as a center to lower the discharge point of the belt with respect to said conveyer whereby bruising of over-ripe vegetables falling from the belt onto said conveyer is minimized.

BENJAMIN I. BUCK.